United States Patent
Swartzentruber et al.

(10) Patent No.: US 10,069,767 B1
(45) Date of Patent: Sep. 4, 2018

(54) METHOD OF DYNAMICALLY ALLOCATING BUFFERS FOR PACKET DATA RECEIVED ONTO A NETWORKING DEVICE

(71) Applicant: Netronome Systems, Inc., Santa Clara, CA (US)

(72) Inventors: Ron L. Swartzentruber, Amesbury, MA (US); Rick Bouley, Maynard, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

(21) Appl. No.: 14/928,493

(22) Filed: Oct. 30, 2015

Related U.S. Application Data

(60) Provisional application No. 62/073,865, filed on Oct. 31, 2014.

(51) Int. Cl.
| | | |
|---|---|---|
| *G06F 13/40* | (2006.01) | |
| *G06F 13/36* | (2006.01) | |
| *G06F 13/00* | (2006.01) | |
| *H04L 12/861* | (2013.01) | |
| *H04L 12/879* | (2013.01) | |

(52) U.S. Cl.
CPC ........ *H04L 49/9005* (2013.01); *H04L 49/901* (2013.01); *H04L 49/9042* (2013.01); *H04L 49/9047* (2013.01)

(58) Field of Classification Search
CPC ................. H04L 45/60; H04L 49/3018; H04L 2012/5681; H04L 49/9021
USPC .......................................................... 370/419
See application file for complete search history.

(56) References Cited

U.S. PATENT DOCUMENTS

| | | | | | |
|---|---|---|---|---|---|
| 6,157,657 | A * | 12/2000 | Humphrey | .......... | H04L 12/6402 370/419 |
| 6,182,210 | B1 * | 1/2001 | Akkary | ................. | G06F 9/3834 712/216 |
| 6,549,964 | B1 * | 4/2003 | Lai | ...................... | G06F 13/4226 710/100 |
| 7,035,212 | B1 * | 4/2006 | Mittal | ..................... | H04L 45/60 370/230 |
| 7,251,716 | B2 * | 7/2007 | Nagae | ................. | G06F 11/1471 711/129 |
| 7,587,549 | B1 * | 9/2009 | Arulambalam | ....... | G06F 3/0613 711/112 |
| 2003/0123455 | A1 * | 7/2003 | Zhao | ..................... | H04L 47/568 370/398 |

(Continued)

*Primary Examiner* — Asad Nawaz
*Assistant Examiner* — Jason Harley
(74) *Attorney, Agent, or Firm* — Imperium Patent Works LLP; Mark D. Marrello; T. Lester Wallace

(57) ABSTRACT

A method of dynamically allocating buffers involves receiving a packet onto an ingress circuit. The ingress circuit includes a memory that stores a free buffer list, and an allocated buffer list. Packet data of the packet is stored into a buffer. The buffer is associated with a buffer identification (ID). The buffer ID is moved from the free buffer list to the allocated buffer list once the packet data is stored in the buffer. The buffer ID is used to read the packet data from the buffer and into an egress circuit and is stored in a de-allocation buffer list in the egress circuit. A send buffer IDs command is received from a processor onto the egress circuit and instructs the egress circuit to send the buffer ID to the ingress circuit such that the buffer ID is pushed onto the free buffer list.

20 Claims, 12 Drawing Sheets

(56) References Cited

U.S. PATENT DOCUMENTS

| | | | |
|---|---|---|---|
| 2006/0002414 A1* | 1/2006 | Du | H04L 1/0002 |
| | | | 370/413 |
| 2011/0246728 A1* | 10/2011 | Maruyama | G06F 12/10 |
| | | | 711/154 |
| 2012/0155256 A1* | 6/2012 | Pope | G06F 13/128 |
| | | | 370/230 |
| 2013/0215792 A1* | 8/2013 | Stark | H04L 49/15 |
| | | | 370/257 |

* cited by examiner

MPLS ROUTER

MAC ISLAND
(INGRESS)

TRANSFERRED OVER MINIPACKET BUS

NBI ISLAND
(INGRESS)

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. INCLUDES A BUFFER LIST IDENTIFIER. |
| 16-BITS | PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 7

| FIELD | WIDTH (BITS) | DESCRIPTION |
|---|---|---|
| PACKET NUMBER | 10 | PACKET NUMBER (0-511) |
| PACKET QUEUE NUMBER | 14 | PACKET QUEUE NUMBER (0-1023) |
| PACKET LENGTH | 14 | TOTAL PACKET LENGTH IN BYTES (0-16383) |
| SEQUENCE NUMBER | 12 | PACKET SEQUENCE NUMBER (0-4095) |
| SEQUENCER NUMBER | 5 | NBI SEQUENCER NUMBER (0-31) |
| CTM MASTER ID | 4 | CTM DATA MASTER ID |
| CTM ISLAND NUMBER | 6 | CTM ISLAND NUMBER |
| CTM PACKET LENGTH | 2 | CTM PACKET LENGTH (0=256B, 1=512B, 2=1KB, 3=2KB) |
| REWRITE SCRIPT OFFSET | 3 | REWRITE SCRIPT OFFSET0=8, 1=16, 2=24, 3=32, 4=40, 5=48, 6=56, 7=UNUSED) |
| SPLIT | 2 | INDICATES IF PACKET IS SPLIT BETWEEN CTM AND MAIN MEMORY (00=MU ONLY PACKET, 01=CTM ONLY PACKET, 10=SPLIT PACKET, 11=NOT USED) |
| CHANNEL | 8 | EGRESS CHANNEL NUMBER |
| BUFFER LIST NUMBER | 2 | BUFFER LIST QUEUE NUMBER ASSOCIATED WITH MU POINTER |
| MU ADDRESS POINTER | 29 | PACKET ADDRESS IN MAIN MEMORY; POINTER TO THE MEMORY BUFFER |
| DROP INDICATOR | 1 | INDICATES THE DESCRIPTOR SHOULD BE DROPPED |
| TOKEN | 2 | TOKEN FIELD |
| RETRY | 1 | INDICATES THIS DESCRIPTOR IS FOR A RETRY PACKET |
| NBI NUMBER | 2 | NBI NUMBER |
| SPARE BITS | 11 | SPARE BITS |

EGRESS PACKET DESCRIPTOR

FIG. 8

ME ISLAND

| SIGNAL | WIDTH (BITS) | DESCRIPTION |
|---|---|---|
| TARGET | 4 | CTM CPP TARGET ID |
| MNEMONIC | . | PE_COMPLETION |
| ACTION | 5 | 19 |
| TOKEN | 2 | [2;0]: *TOKEN |
| | | 00: DROP PACKET (USED FOR SEQUENCE NUMBER ONLY) |
| | | 01: UNICAST PACKET (FREE ON LAST TRANSFER) |
| | | 10: MULTICAST PACKET (DON'T FREE ON LAST TRANSFER) |
| | | 11: MULTICAST PACKET (FREE ON LAST TRANSFER) |
| LENGTH | 5 | When PM is enabled (Dataref[1;11]=0), lower 4 bits of Packet Start Offset: *8B Aligned (0=8, 1=16, ... 62=504) |
| | | When PM is disabled (Dataref[1;11]=1), lower 5 bits of Packet Start Offset: *4B Aligned (0=8, 1=12, 2=16, 3=20, ... 126=512) |
| BYTE MASK | 8 | [3; 5]: *DropPrecedence |
| | | [5; 0]: *SequencerNumber |
| ADDRESS | 40 | [2;38]: ***2b10 |
| | | [6;32]: ***CTM Island Number |
| | | [7;25]: Unused |
| | | [9;16]: Packet Number |
| | | [2;14]: Packet Start Byte Offset within 4B alignment when PM is disabled, unused when PM is enabled |
| | | [14; 0]: *Total Packet Length in Bytes |
| DATA MASTER ISLAND | 6 | [2; 4]: top 2 bits of Packet Start Offset |
| | | [4; 0]: *SequenceNumber[4;8] |
| DATA MASTER | 4 | [4; 0]: *SequenceNumber[4;4] |
| DATAREF | 14 | [2;12]: NBI Number |
| | | [1;11]: 0=PM enabled, 1=PM disabled |
| | | [1;10]: *Retry (Indicates this is a retry packet) |
| | | [10; 0]: *Tx Queue Number |
| SIGNAL MASTER | 8 | [4; 0] *SequenceNumber[4;0] |
| SIGNALREF | 7 | UNUSED |
| * | | DON'T CARE FOR PACKET ENGINE |
| ** | | DON'T CARE FOR NBI TRAFFIC MANAGER |
| *** | | FIELDS USED FOR ROUTING COMMAND TO CTM |

PACKET PROCESSING COMPLETE COMMAND

FIG. 10

MU ISLAND

NBI ISLAND
(EGRESS)

MAC ISLAND
(EGRESS)

DYNAMIC ALLOCATION OF BUFFERS

US 10,069,767 B1

METHOD OF DYNAMICALLY ALLOCATING BUFFERS FOR PACKET DATA RECEIVED ONTO A NETWORKING DEVICE

CROSS REFERENCE TO RELATED APPLICATIONS

This application claims the benefit under 35 U.S.C. § 119 from provisional U.S. patent application Ser. No. 62/073,865, entitled "A METHOD OF DYNAMICALLY ALLOCATING BUFFERS FOR PACKET DATA RECEIVED ONTO A NETWORKING DEVICE", filed Oct. 31, 2014. The above-listed provisional application is incorporated by reference.

TECHNICAL FIELD

The described embodiments relate generally to managing memory allocation and more specifically to dynamically managing memory allocation for packet data processing within the network flow processor.

SUMMARY

In a first novel aspect, a packet is received onto a network device. The network device includes an ingress circuit, a buffer, and an egress circuit. The ingress circuit includes a memory that stores a free buffer list, and an allocated buffer list. Packet data of the packet is stored into a buffer. The buffer is associated with a buffer identification (ID). The buffer ID is moved from the free buffer list to the allocated buffer list once the packet data is stored in the buffer. The buffer ID is used to read the packet data from the buffer and into an egress circuit and is stored in an de-allocate buffer list in the egress circuit. A send buffer IDs command is received from a processor onto the egress circuit and instructs the egress circuit to send the buffer ID to the ingress circuit such that the buffer ID is pushed onto the free buffer list in the ingress circuit.

In a second novel aspect, a network device includes an ingress circuit, a buffer and an egress circuit. The ingress circuit includes a first memory unit that stores a free buffer list and an allocated buffer list for a packet. The buffer stores the packet. The buffer is associated with a buffer identification (ID). The egress circuit uses the buffer ID to read the packet from the buffer. The egress circuit includes a second memory unit that stores a de-allocate buffer list. When a threshold condition is met the egress circuit outputs an event packet. The egress circuit outputs a buffer ID in response to receiving a send buffer IDs command.

In a third novel aspect, a network device includes an ingress circuit, an egress circuit and a processor. The ingress circuit maintains a free buffer list and an allocated buffer list. The egress circuit that maintains a de-allocate buffer list. The buffer lists store buffer identifications (buffer IDs). The processor processes packets received onto the network device. The network device further includes means for generating an indication that at least a threshold number of buffer IDs are present on the egress circuit, and means for communicating the indication to the processor from the egress circuit.

In one example, the means for generating is an event bus that traverses the egress circuit. In another example, the processor can monitor event packets communicated along the event bus.

In one example, the means for communicating is a Command/Push/Pull (CPP) bus.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table that sets forth the parts of an ingress packet descriptor.

FIG. 8 is a table that sets forth the parts of an egress packet descriptor.

FIG. 10 is a table listing the signals (fields) included in a packet processing complete command.

DETAILED DESCRIPTION

Reference will now be made in detail to background examples and some embodiments of the invention, examples of which are illustrated in the accompanying drawings. In the description and claims below, relational terms such as "horizontal", "vertical", "lateral", "top", "upper", "bottom", "lower", "right", "left", "over" and "under" may be used to describe relative orientations between different parts of a structure being described, and it is to be understood that the overall structure being described can actually be oriented in any way in three-dimensional space.

Figure 1:
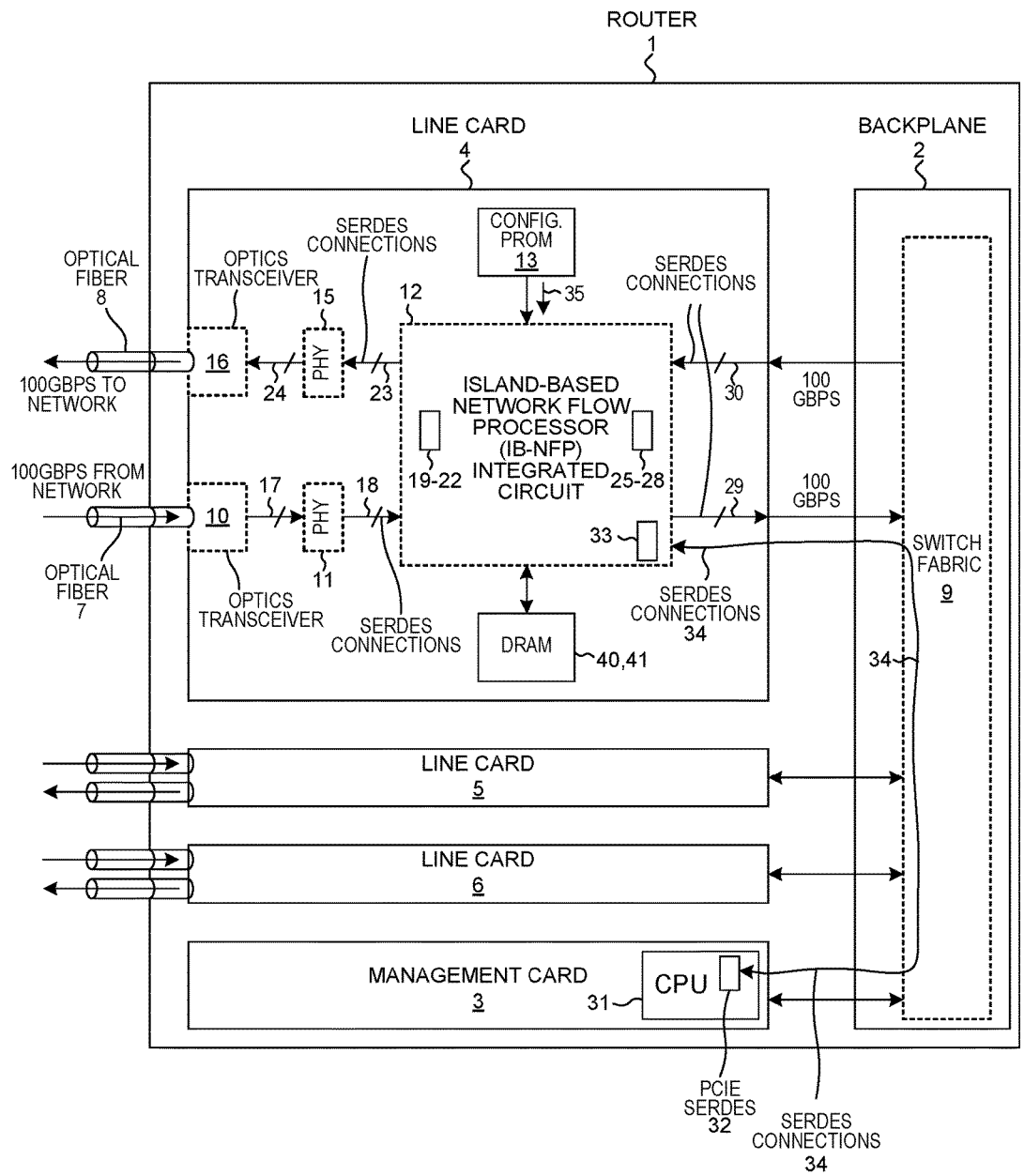
FIG. 1 is a simplified diagram of an MPLS (MultiProtocol Label Switching) router 1.

FIG. 1 is a simplified diagram of an MPLS (MultiProtocol Label Switching) router 1. Router 1 includes a backplane 2, a management card 3, and line cards 4-6. Each of the line cards can receive 100 Gbps (gigabits per second) packet traffic from another network via a fiber optic cable 7 and also can transmit 100 Gbps packet traffic to another network via another fiber optic cable 8. In addition, each line card can receive 100 Gbps packet traffic from the switch fabric 9 of the backplane and can also transmit 100 Gbps packet traffic to the switch fabric. Line cards 4-6 are of identical construction. In this example, flows of packets are received into line card 4 from a network via the fiber optic cable 7 or from the switch fabric 9. Certain functions then need to be performed on the line card including looking up MPLS labels, determining destinations for incoming flows of packets, and scheduling the transmitting of flows of packets. Packets of the flows pass from the line card 4 and out either to the network via optical cable 8 or to the switch fabric 9.

Line card 4 includes a first optical transceiver 10, a first PHY integrated circuit 11, an Island-Based Network Flow Processor (IB-NFP) integrated circuit 12, a configuration Programmable Read Only Memory (PROM) 13, an external memory such as Dynamic Random Access Memory (DRAM) 40-41, a second PHY integrated circuit 15, and a second optical transceiver 16. Packet data received from the network via optical cable 7 is converted into electrical signals by optical transceiver 10. PHY integrated circuit 11 receives the packet data in electrical form from optical transceiver 10 via connections 17 and forwards the packet data to the IB-NFP integrated circuit 12 via SerDes connections 18. In one example, the flows of packets into the IB-NFP integrated circuit from optical cable 7 is 100 Gbps traffic. A set of four SerDes circuits 19-22 within the IB-NFP integrated circuit 12 receives the packet data in serialized form from SerDes connections 18, deserializes the packet data, and outputs packet data in deserialized form to digital circuitry within IB-NFP integrated circuit 12.

Similarly, IB-NFP integrated circuit 12 may output 100 Gbps packet traffic to optical cable 8. The set of four SerDes circuits 19-22 within the IB-NFP integrated circuit 12 receives the packet data in deserialized form from digital circuitry within integrated circuit 12. The four SerDes circuits 19-22 output the packet data in serialized form onto SerDes connections 23. PHY 15 receives the serialized form packet data from SerDes connections 23 and supplies the packet data via connections 24 to optical transceiver 16. Optical transceiver 16 converts the packet data into optical form and drives the optical signals through optical cable 8. Accordingly, the same set of four duplex SerDes circuits 19-22 within the IB-NFP integrated circuit 12 communicates packet data both into and out of the IB-NFP integrated circuit 12.

IB-NFP integrated circuit 12 can also output packet data to switch fabric 9. Another set of four duplex SerDes circuits 25-28 within IB-NFP integrated circuit 12 receives the packet data in deserialized form, and serializes the packet data, and supplies the packet data in serialized form to switch fabric 9 via SerDes connections 29. Packet data from switch fabric 9 in serialized form can pass from the switch fabric via SerDes connections 30 into the IB-NFP integrated circuit 12 and to the set of four SerDes circuits 25-28. SerDes circuits 25-28 convert the packet data from serialized form into deserialized form for subsequent processing by digital circuitry within the IB-NFP integrated circuit 12.

Management card 3 includes a CPU (Central Processing Unit) 31. CPU 31 handles router management functions including the configuring of the IB-NFP integrated circuits on the various line cards 4-6. CPU 31 communicates with the IB-NFP integrated circuits via dedicated PCIE connections. CPU 31 includes a PCIE SerDes circuit 32. IB-NFP integrated circuit 12 also includes a PCIE SerDes 33. The configuration information passes from CPU 31 to IB-NFP integrated circuit 12 via SerDes circuit 32, SerDes connections 34 on the backplane, and the PCIE SerDes circuit 33 within the IB-NFP integrated circuit 12. External configuration PROM (Programmable Read Only Memory) integrated circuit 13 stores other types of configuration information such as information that configures various lookup tables on the IB-NFP integrated circuit. This configuration information 35 is loaded into the IB-NFP integrated circuit 12 upon power up. As is explained in further detail below, IB-NFP integrated circuit 12 can store various types of information including buffered packet data in external DRAM integrated circuits 40-41.

Figure 2:
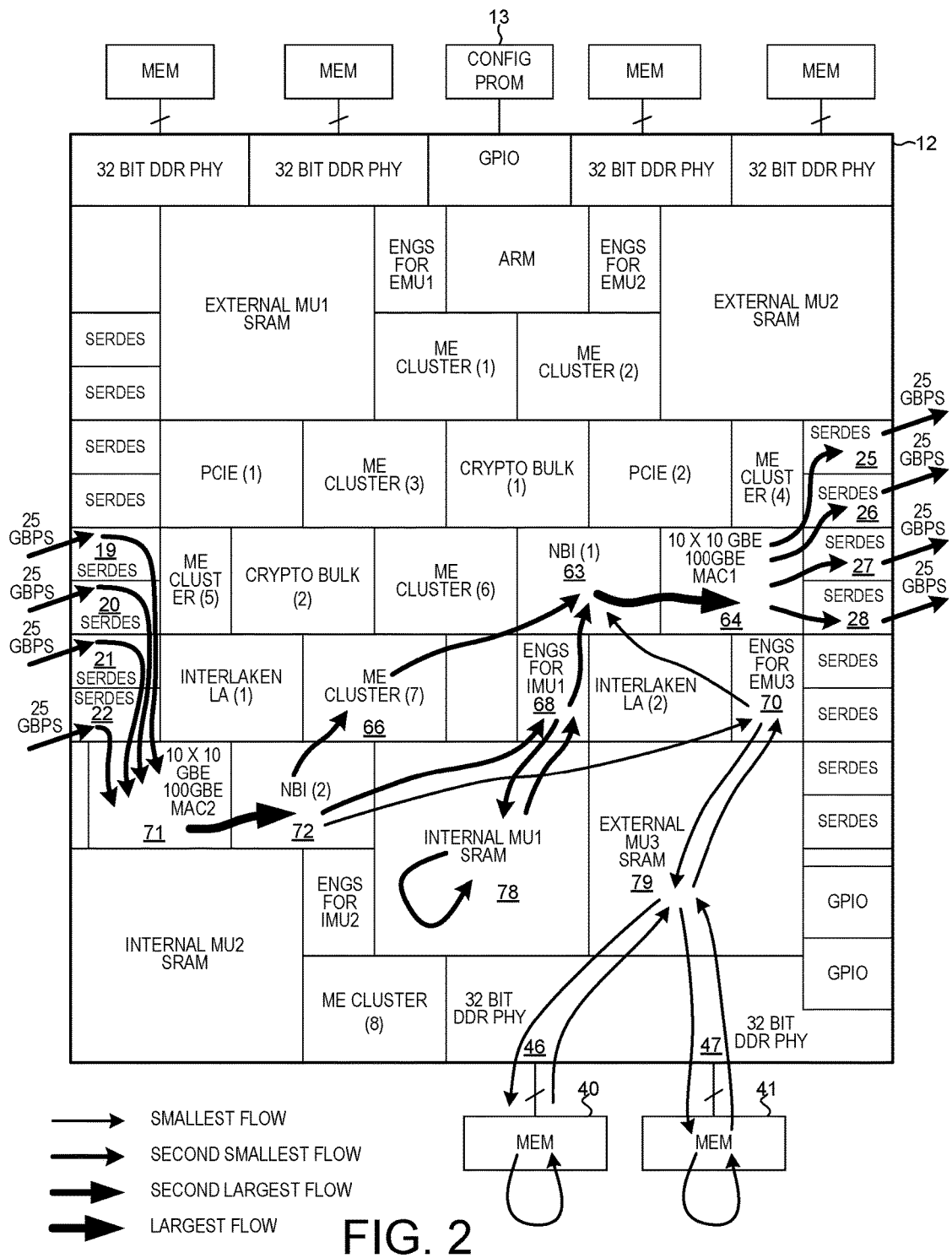
FIG. 2 is a schematic diagram that illustrates an operational example of IB-NFP integrated circuit 12 within the MPLS router 1 of FIG. 1.

FIG. 2 is a schematic diagram that illustrates an operational example of IB-NFP integrated circuit 12 within the MPLS router 1 of FIG. 1. 100 Gbps packet traffic is received via optical cable 7 (see FIG. 1), flows through optics transceiver 10, flows through PHY integrated circuit 11, and is received onto IB-NFP integrated circuit 12 spread across the four SerDes I/O blocks 19-22. Twelve virtual input ports are provided at this interface in the example of FIG. 1. The symbols pass through direct dedicated conductors from the SerDes blocks 19-22 to ingress MAC island 71. Ingress MAC island 71 converts successive symbols delivered by the physical coding layer into packets by mapping symbols to octets, by performing packet framing, and then by buffering the resulting packets for subsequent communication to other processing circuitry. The packets are communicated from MAC island 71 across a private inter-island bus to ingress NBI (Network Bus Interface) island 72. Although dedicated connections are provided for this purpose in the particular example described here, in other examples the packets are communicated from ingress MAC island 71 to ingress NBI island via the configurable mesh data bus.

For each packet, the functional circuitry of ingress NBI island 72 examines fields in the header portion to determine what storage strategy to use to place the packet into memory. In one example, the NBI island examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP.

In the operational example of FIG. 2, NBI island 72 examines a packet header, performs packet preclassification, determines that the packet is a fast-path packet, and determines that the header portion of the packet should be placed into a CTM (Cluster Target Memory) in ME (Microengine) island 66. The header portion of the packet is therefore communicated across the configurable mesh data bus from NBI island 72 to ME island 66. The CTM is tightly coupled to the ME. The ME island 66 determines header modification and queuing strategy for the packet based on the packet flow (derived from packet header and contents) and the ME island 66 informs a second NBI island 63 of these. In this simplified example being described, the payload portions of fast-path packets are placed into internal SRAM (Static Random Access Memory) MU block 78 and the payload portions of exception packets are placed into external DRAM 40 and 41.

Half island 68 is an interface island through which all information passing into, and out of, SRAM MU block 78 passes. The functional circuitry within half island 68 serves as the interface and control circuitry for the SRAM within block 78. For simplicity purposes in the discussion below, both half island 68 and MU block 78 may be referred to together as the MU island, although it is to be understood that MU block 78 is actually not an island as the term is used here but rather is a block. In one example, MU block 78 is an amount of so-called "IP" that is designed and supplied commercially by a commercial entity other than the commercial entity that designs and lays out the IB-NFP integrated circuit. The area occupied by block 78 is a keep out area for the designer of the IB-NFP in that the substantially all the wiring and all the transistors in block 78 are laid out by the memory compiler and are part of the SRAM. Accordingly, the mesh buses and associated crossbar switches of the configurable mesh data bus, the mesh control bus, and the mesh event bus do not pass into the area of block 78. No transistors of the mesh buses are present in block 78. There is an interface portion of the SRAM circuitry of block 78 that is connected by short direct metal connections to circuitry in half island 68. The data bus, control bus, and event bus structures pass into and over the half island 68, and through the half island couple to the interface circuitry in block 78. Accordingly, the payload portion of the incoming fast-path packet is communicated from NBI island 72, across the configurable mesh data bus to SRAM control island 68, and from control island 68, to the interface circuitry in block 78, and to the internal SRAM circuitry of block 78. The internal SRAM of block 78 stores the payloads so that they can be accessed for flow determination by the ME island.

In addition, a preclassifier in the ingress NBI island determines that the payload portions for others of the packets should be stored in external DRAM 40 and 41. For example, the payload portions for exception packets are stored in external DRAM 40 and 41. Interface island 70, IP block 79, and DDR PHY I/O blocks 46 and 47 serve as the interface and control for external DRAM integrated circuits 40 and 41. The payload portions of the exception packets are therefore communicated across the configurable mesh data bus from NBI island 72, to interface and control island 70, to external MU SRAM block 79, to 32-bit DDR PHY I/O blocks 46 and 47, and to external DRAM integrated circuits 40 and 41. At this point in the operational example, the packet header portions and their associated payload portions are stored in different places. The payload portions of fast-path packets are stored in internal SRAM in MU block 78, whereas the payload portions of exception packets are stored in external SRAM in external DRAMs 40 and 41.

ME island 66 informs second NBI island 63 where the packet headers and the packet payloads can be found and provides the second NBI island 63 with an egress packet descriptor for each packet. The egress packet descriptor indicates a queuing strategy to be used on the packet. Second NBI island 63 uses the egress packet descriptor to read the packet headers and any header modification from ME island 66 and to read the packet payloads from either internal SRAM 78 or external DRAMs 40 and 41. Second NBI island 63 places packet descriptors for packets to be output into the correct order. For each packet that is then scheduled to be transmitted, the second NBI island uses the packet descriptor to read the header portion and any header modification and the payload portion and to assemble the packet to be transmitted. Note that the header modification is not actually part of the egress packet descriptor, but rather it is stored with the packet header by the ME when the packet is presented to the NBI. The second NBI island then performs any indicated packet modification on the packet. The resulting modified packet then passes from second NBI island 63 and to egress MAC island 64.

Egress MAC island 64 buffers the packets, and converts them into symbols. The symbols are then delivered by conductors from the MAC island 64 to the four SerDes I/O blocks 25-28. From SerDes I/O blocks 25-28, the 100 Gbps outgoing packet flow passes out of the IB-NFP integrated circuit 12 and across SerDes connections 34 (see FIG. 1) and to switch fabric 9. Twelve virtual output ports are provided in the example of FIG. 1.

Figure 3:
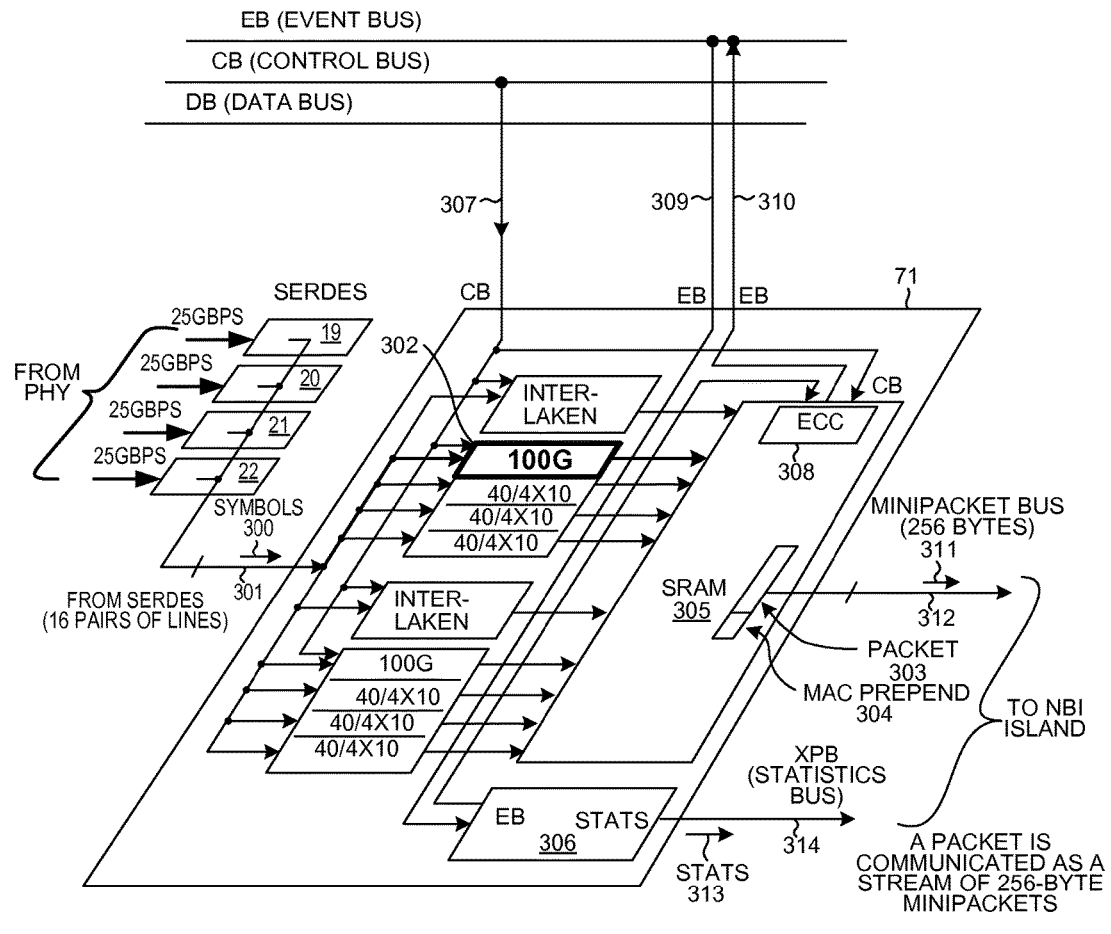
FIG. 3 is a diagram of the four SerDes I/O blocks 19-22 and the ingress MAC island 71 of IB-NFP integrated circuit 12.

FIG. 3 is a diagram of the four SerDes I/O blocks 19-22 and the ingress MAC island 71. The symbols 300 pass from the four SerDes I/O blocks and to the ingress MAC island across dedicated conductors 301. The symbols are converted into packets by a 100 Gbps ethernet block 302. The 100 Gbps ethernet block 302 analyzes the packets and places the results in this analysis at the beginning of the packet in the form of a "MAC prepend" value. The resulting packets and associated MAC prepend values are then buffered in SRAM 305. Reference numeral 303 identifies a part of the block that represents one packet and reference numeral 304 identifies a part of the block that represents the MAC prepend value. The MAC prepend value 304 includes: 1) an indication of the length of the packet, 2) an indication whether the packet is an IP packet, 3) and indication of whether the checksums are correct, and 4) a time stamp indicating when the packet was received.

As packets are loaded into SRAM, a statistics block 306 counts the number of packets that meet certain criteria. Various sub-circuits of the ingress MAC island are configurable. The input conductors 307 labeled CB couples the certain portions of the MAC island to the control bus tree so that these portions receive configuration information from the root of control bus tree. SRAM block 305 includes error detection and correction circuitry (ECC) 308. Error information detected and collected by ECC block 308 and statistics block 306 is reported through the local event bus and global event chain back to the ARM island 51. Ingress MAC island 71 is part of one of the local event rings. Event packets are circulated into the MAC island via conductors 309 and are circulated out of the MAC island via conductors 310. Packets that are buffered in SRAM 305 are then output from the MAC island to the ingress NBI island 72 in the form of one or more 256 byte minipackets 311 communicated across dedicated connections 312. Statistics information 313 is also communicated to the ingress NBI island 72 via dedicated connections 314.

Figure 4:
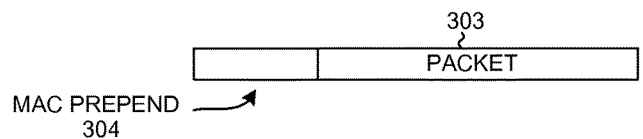
FIG. 4 is a diagram that illustrates how a packet is communicated as a sequence of minipackets across connections 312.

FIG. 4 is a diagram of packet 303 communicated across connections 312.

Figures 5, 6:
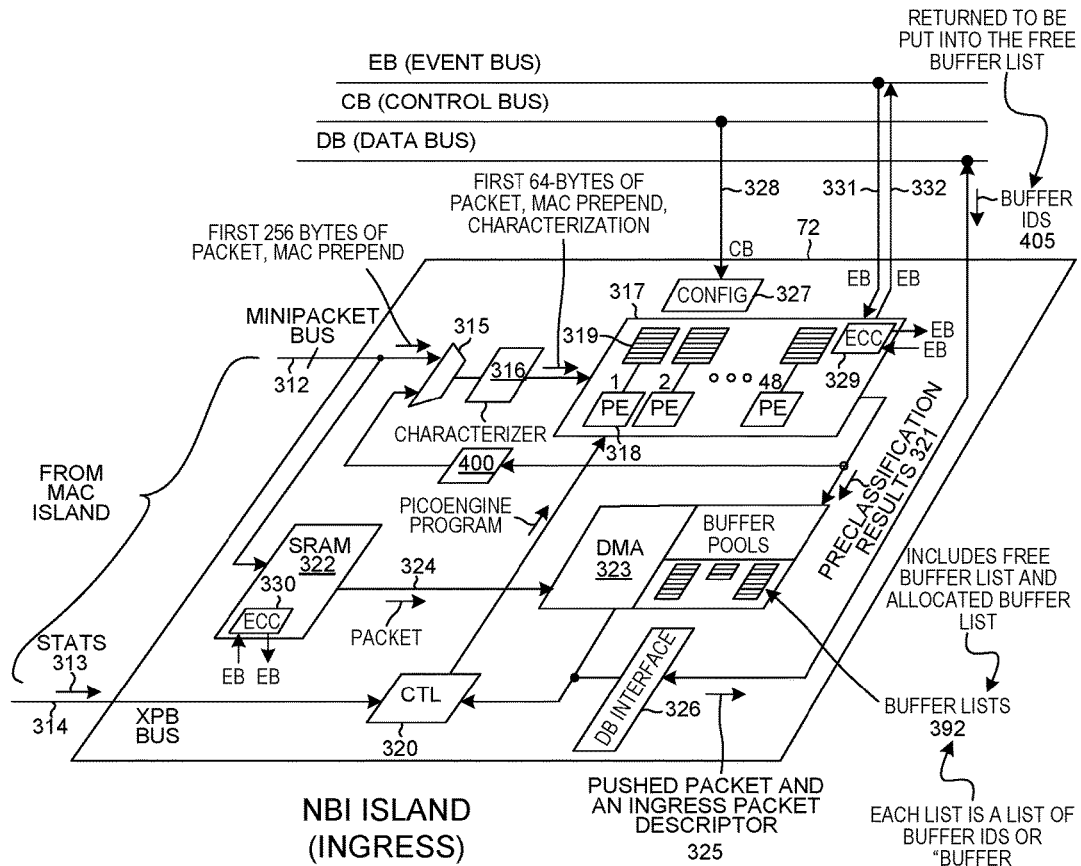
FIG. 5 is a diagram of ingress NBI island 72.
FIG. 6 is a table that sets forth the parts of preclassification results 321.

FIG. 5 is a diagram of ingress NBI island 72. Ingress NBI island 72 receives the MAC prepend and the minipackets via dedicated connections 312 from the ingress MAC island 72. The first 256 bytes of the packet and the MAC prepend pass through multiplexing circuitry 315 and to a characterizer 316. Characterizer 316 outputs characterization information, the first sixty-four bytes of the packet, and the MAC prepend. This is passed to a pool 317 of forty-eight picoengines. Each picoengine executes a program stored in an associated instruction control store. Reference numeral 318 identifies the first picoengine and reference numeral 319 identifies its instruction control store. The program in the instruction control store for each picoengine can be updated and changed under software control via control block 320. Control block 320 is also usable to receive the statistics information 313 from the MAC island via XPB bus connections 314. To perform deeper and deeper analysis into the header structure of an incoming packet, the output of the pool 317 can be passed back through a tunnel recirculation path and tunnel recirculation FIFO 400 to the characterizer 316 in an iterative fashion. Pool 317 outputs preclassification results 321.

FIG. 6 is a table that sets forth the part of preclassification results 321. The preclassification results 321 include: 1) a determination of which one of multiple buffer pools to use to store the packet, 2) a sequence number for the packet in a particular flow of packets through the IB-NFP, and 3) user metadata. The user metadata is typically a code generated by the picoengines, where the code communicates certain information about the packet. In the present operational example, the user metadata includes a bit. If the bit is set then the packet was determined to be of a first type (an exception packet), whereas if the bit is not set then the packet was determined to be of a second type (a fast-path packet).

The packet is buffered in SRAM 322. A buffer pool is a set of targets in ME islands where header portions can be placed. A buffer list is a list of memory addresses where payload portions can be placed. DMA engine 323 can read the packet out of SRAM via conductors 324, then use the buffer pools to determine a destination to which the packet header is to be DMA transferred, and use the buffer lists to determine a destination to which the packet payload is to be DMA transferred. The DMA transfers occur across the configurable mesh data bus. In the case of the exception packet of this example the preclassification user metadata and buffer pool number indicate to the DMA engine that the packet is an exception packet and this causes a first buffer pool and a first different buffer list to be used, whereas in the case of the fast-path packet the preclassification user metadata and buffer pool number indicate to the DMA engine that the packet is a fast-path packet and this causes a second buffer pool and a second buffer list to be used.

The ingress NBI island maintains and stores a number of buffer lists 392. One of the buffer lists is a free buffer list. Packet data is received from an ingress MAC island into the ingress NBI island and is stored in SRAM 322. Individual portions of the packet data are stored in buffers in main memory. Each buffer has an associated buffer ID. The packet data of a packet may occupy multiple buffers, where the buffer IDs for the buffers are in one of the buffer lists. The DMA 323 causes the portions of packet data to be written into their corresponding buffers in external memory. The DMA 323 uses the CPP bus to do this. The DMA 323 also sends an ingress packet descriptor to a CTM in the ME island.

Block 326 is data bus interface circuitry through which the configurable mesh data bus in accessed. Arrow 325 represents packets that are DMA transferred out of the NBI island 72 by DMA engine 323. Each packet is output with a corresponding ingress packet descriptor.

FIG. 7 is a table that sets forth the parts of an ingress packet descriptor. An ingress packet descriptor includes: 1) an address indicating where and in which ME island the header portion is stored, 2) an address indicating where and in which MU island the payload portion is, 3) how long the packet is, 4) a sequence number for the flow to which the packet belongs, 5) user metadata.

The programs stored in the instruction stores that are executable by the picoengines can be changed multiple times a second as the router operates. Configuration block 327 receives configuration information from the control bus CB tree via connections 328 and supplies the configuration information to various ones of the sub-circuits of NBI island 72 that are configurable. Error detection and correction (ECC) circuitry 329 collects error information such as errors detected in the contents of the instruction stores. ECC circuitry 329 and ECC circuitry 330 are coupled via connections 331 and 332 and other internal island connections not shown to be part of the local event ring of which the ingress MAC island 72 is a part. A detailed description of the event ring is provided in U.S. patent application Ser. No. 13/399,678, entitled "LOCAL EVENT RING IN AN ISLAND-BASED NETWORK FLOW PROCESSOR", filed Feb. 17, 2012, now U.S. Pat. No. 9,619,418, by Gavin J. Stark (the subject matter of which is incorporated herein by reference).

Figure 9:
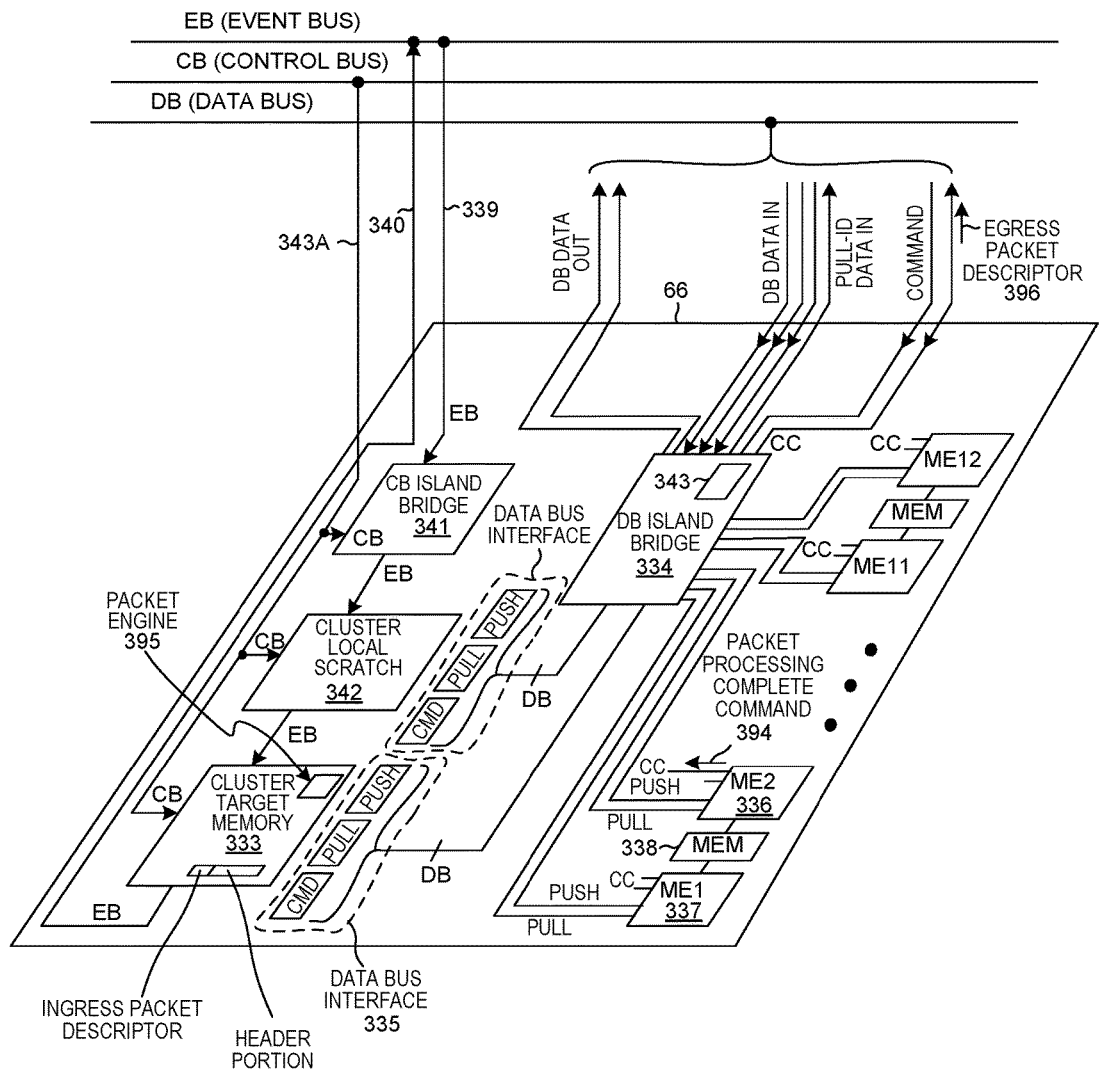
FIG. 9 is a diagram of the microengine (ME) island 66.

FIG. 9 is a diagram of the microengine (ME) island 66. In the present operational example, packet headers and the associated preclassification results are DMA transferred from the ingress NBI island 72 across the configurable mesh data bus and into the Cluster Target Memory (CTM) 333 of the ME island 66. The DMA engine 323 in the ingress NBI island is the master and the CTM 333 is the target for this transfer. The packet header portions and the associated ingress packet descriptors pass into the ME island via data bus island bridge 334 and data bus interface circuitry 335. Once in the CTM 333, the header portions are analyzed by one or more microengines. The microengines have, through the DB island bridge 334, a command out interface, a pull-id in interface, a pull-data out interface, and a push data in interface. There are six pairs of microengines, with each pair sharing a memory containing program code for the microengines. Reference numerals 336 and 337 identify the first pair of microengines and reference numeral 338 identifies the shared memory. As a result of analysis and processing, the microengines modify each ingress packet descriptor to be an egress packet descriptor 396 as shown in FIG. 8. In one example, upon completion of the analysis and processing, microengine 336 outputs a packet processing complete command 394 on the command bus. The signals included in the packet processing complete command 394 are listed in FIG. 10. The packet processing complete command 394 is received by the cluster target memory 333. Cluster target memory 33 includes packet engine 395. In response to receiving the packet processing complete command, the packet engine 395 outputs packet descriptor 396 on the command bus as shown in FIG. 9. A detailed description of packet engine 395 is provided in U.S. patent application Ser. No. 14/464,690, entitled "PACKET ENGINE THAT USES PPI ADDRESSING", filed Aug. 20, 2015, now U.S. Pat. No. 9,699,107, by Salma Mirza et al. (the subject matter of which is incorporated herein by reference).

Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is, 8) packet sequencer identification to be used by the reorder block in determining in-order packet transmissions, 9) a drop precedence value that indicates a variable drop probability for a instantaneous queue depth range, 10) a split indicator that indicates if a packet is split between CTM and main memory or storing in a single memory location, and 11) a priority indicator that indicates if the packet associated with the packet descriptor is a high priority packet or a low priority packet.

Regarding the split indicator, the split indicator allows different portion of a packet to be stored in different memory locations. In one example, the split indicator may be used to store a first part of a packet in the cluster target memory and a second portion of the packet in main memory located in the MU island. The cluster target memory can be quickly accessed by a microengines in the ME island, while access time to main memory in the MU island is takes additional time. One beneficial use of this dynamic splitting and storing of a packet is to split the header portion of the packet from the payload portion of the packet. The header portion of the packet is stored in the cluster target memory and the payload portion of the packet is stored in main memory. This split allows the microengine fast access to the header portion of the packet which is necessary to determine packet routing, while many time the microengine does not need to access the payload portion of the packet at all to determine packet routing. In this fashion, the quickly accessible cluster target memory is only used to store packet information that is actually used by the microengines and storage space in the cluster target memory is not wasted by storing the packet information that is not used by the microengines. In the event that the portion of the packet that is necessary for processing changes, the microengines can communicate change to the ingress NBI via the CPP bus and instruct the ingress NBI to change which portion of the packet is stored in the cluster target memory and which portion of the packet is stored in the main memory. This dynamic control ensures that fast access cluster target memory is always most efficiently utilized.

Regarding the priority indicator, in one example of a high priority packet is a control plane packet. Another example of a high priority packet is a maintenance packet. On the contrary, one example of a low priority packet is an HTTP packet.

Memory errors and other events detected in the ME island are reported via a local event ring and the global event chain back to the ARM island 51. A local event ring is made to snake through the ME island for this purpose. Event packets from the local event chain are received via connections 339 and event packets are supplied out to the local event chain via connections 340. The CB island bridge 341, the cluster local scratch 342, and CTM 333 can be configured and are therefore coupled to the control bus CB via connections 343A so that they can receive configuration information from the control bus CB.

A microengine within the ME island can use data bus commands to interact with a target, regardless of whether the target is located locally on the same ME island as the microengine or whether the target is located remotely in another island, using the same configurable data bus communications. If the target is local within the ME island, then the microengine uses data bus commands and operations as described above as if the memory were outside the island in another island, except that bus transaction values do not have a final destination value. The bus transaction values do not leave the ME island and therefore do not need the final destination information. If, on the other hand, the target is not local within the ME island then intelligence 343 within the DB island bridge adds the final destination value before the bus transaction value is sent out onto the configurable mesh data bus. From the perspective of the microengine master, the interaction with the target has the same protocol and command and data format regardless of whether the target is local or remote.

Figure 11:
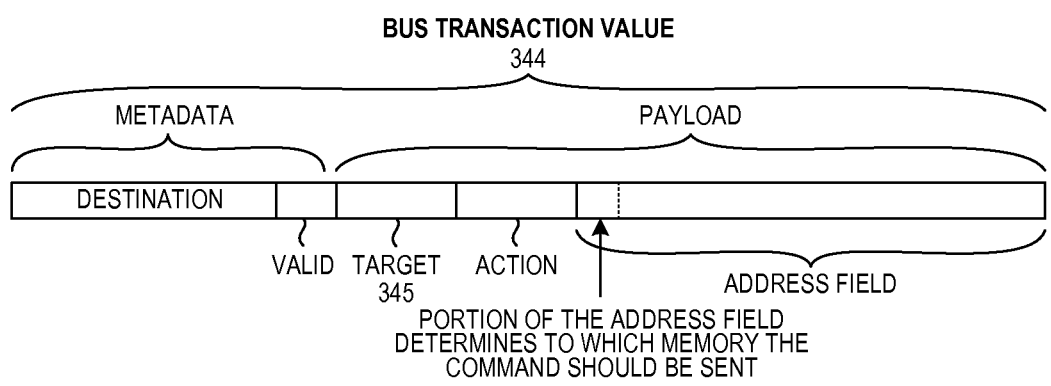
FIG. 11 is a bit sequence map of a bus transaction value used to communicate packet data from the ingress NBI island 72 to the ME island 66 across the CPP data bus.

FIG. 11 is a diagram of a bus transaction value 344 used to communicate packet data from the ingress NBI island 72 to the ME island 66. In a multi-target island such as the ME island 66, the target field 345 of the bus transaction value contains a number that indicates which target it is that is to receive the payload of the bus transaction value. In the present example, the header portions of the incoming 100 Gbps flow are written into CTM 333.

Figure 12:
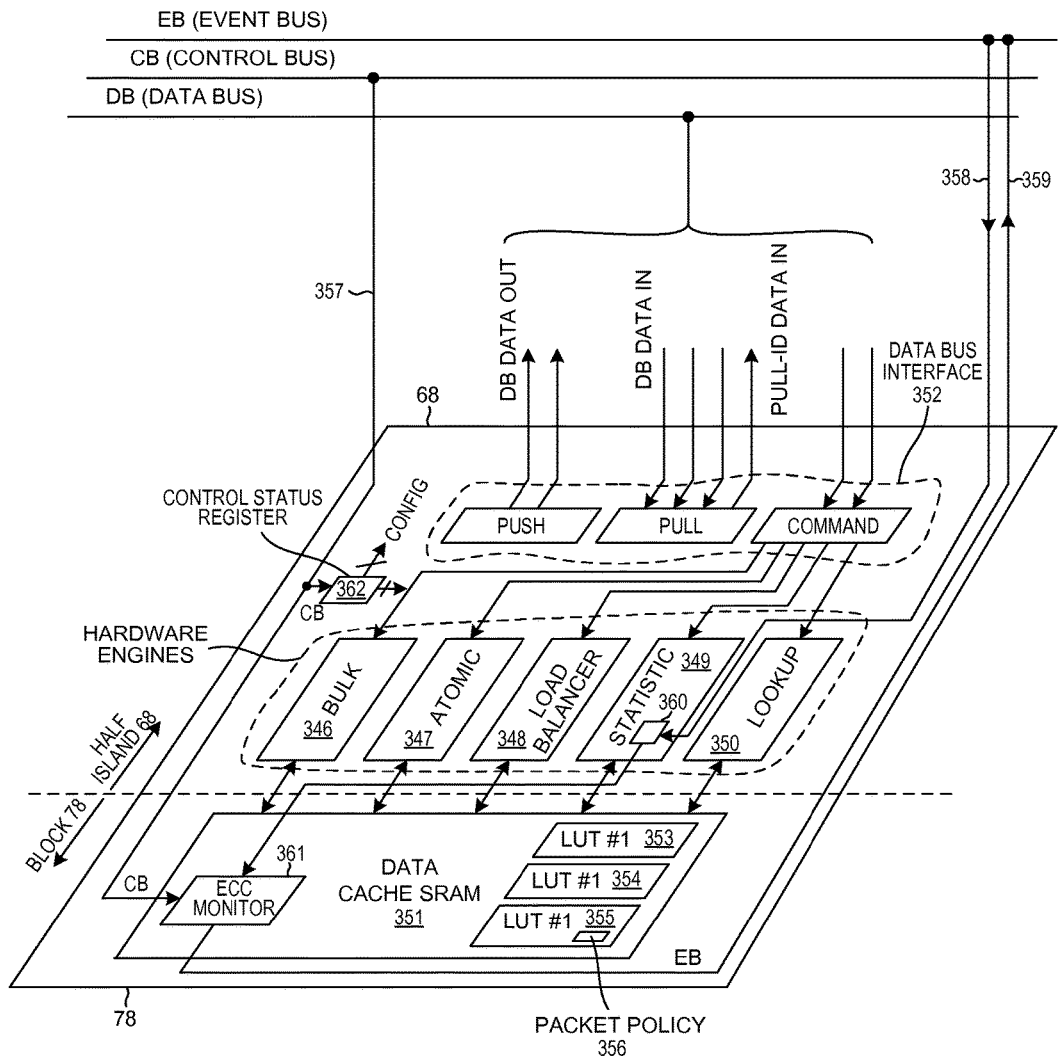
FIG. 12 is a diagram of MU half island 68 and associated SRAM block 78.

FIG. 12 is a diagram of MU half island 68 and SRAM block 78. MU half island 68 includes several hardware engines. In the operational example, packet payloads are DMA transferred directly from ingress NBI island 72 and across the configurable mesh data bus, through data bus interface 352 of half island 68, and into the data cache SRAM 351 block 78. The ingress NBI DMA engine 323 issues a bulk write command across the configurable mesh data bus to the bulk transfer engine 346. The destination is the MU island. The action is bulk write. The address where the data is to be written into the MU island is the address taken out of the appropriate buffer list. The bulk write command received at the MU is a bulk write, so the data bus interface 352 presents the command to the bulk engine. The bulk engine examines the command which is a write. In order to perform a write the bulk engine needs data, so the bulk engine issues a pull-id through the pull portion of interface 352, which in turn issues a pull-id back onto the configurable mesh data bus. The NBI DMA engine 323 receives the pull-id. Part of the pull-id is a data reference which indicates to the DMA engine which part of the packet is being requested as data. The DMA engine uses the data reference to read the requested part of the packet, and presents that across the data part of the data bus back to the bulk engine 346. The bulk engine 346 then has the write command and the packet data. The bulk engine 346 ties the two together, and it then writes the packet data into the SRAM 351 at the address given in the write command. In this way, packet payload portions pass from DMA engine in the ingress NBI island, across the configurable mesh data bus, through the data bus interface 352, through a bulk transfer engine 346, and into data cache SRAM 351.

In the present operational example, a microengine in the ME island 66 issues a lookup command across the configurable mesh data bus to have lookup hardware engine 350 examine tables in SRAM 351 for the presence of given data. The data to be looked for in this case is a particular MPLS label. The lookup command as received onto the MU island is a lookup command so the data base interface 352 presents the lookup command to the lookup engine. The lookup command includes a table descriptor of what part to memory to look in. The lookup command also contains a pull-id reference indicating what to look for (the MPLS label in this case). The data to look for is actually stored in transfer registers of the originating microengine. The lookup engine 350 therefore issues a pull-id out onto the configurable mesh data bus request back to the originating microengine. The microengine returns the requested data (the MPLS label to look for) corresponding to the reference id. The lookup engine now has the lookup command, the table descriptor, and the MPLS label that it is to look for. In the illustration there are three tables 353-355. A table description identifies one such table by indicating the starting address of the table in SRAM 351, and how large the table is. If the lookup operation is successful in that the lookup hardware engine 350 finds the MPLS label in the table identified by the table descriptor, then the lookup hardware engine 350 returns a predetermined value "Packet Policy" 356 back to the requesting microengine. A packet policy is a code that indicates: 1) a header modification to be done, and 2) a queuing strategy to use. Lookup engine 350 returns the packet policy 356 to the originating microengine by pushing the data (the packet policy) via the push interface of the configurable mesh data bus.

Various parts of the MU island are configurable by changing the contents of registers and memory via the control bus CB and connections 357 and control status registers 362. Errors detected on the MU island by circuits 360 and 361 are reported into a local event ring. Event packets from the local event ring are received via input connections 358 and the MU island outputs event packets to the local even ring via output connections 359. Various sub-circuits of the MU island are configurable.

Figure 13:
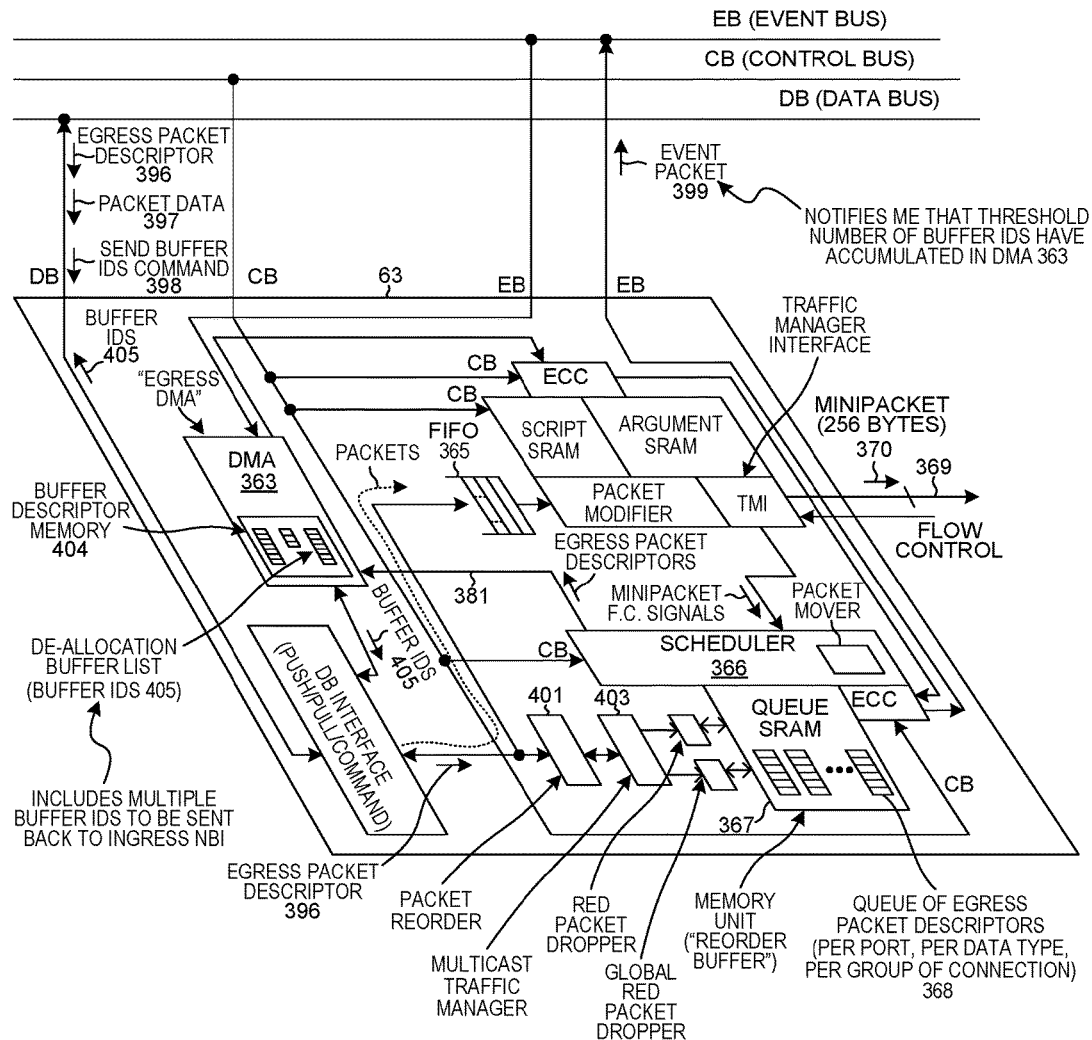
FIG. 13 is a diagram of egress NBI island 63.

FIG. 13 is a diagram of egress NBI island 63. In the operational example, ME island 66 instructs the egress NBI island 63 to transmit a packet by supplying the egress NBI island with an egress packet descriptor 396 of the packet to be transmitted. The ME island supplies the egress packet descriptor to the egress NBI island by issuing a transmit packet command across the configurable mesh data bus and to the packet reorder block 401. The packet reorder block 401 responds by pulling the egress packet descriptor from the ME island across the configurable mesh data bus. In this way, multiple egress packet descriptors enter packet reorder block 401. These egress packet descriptors are reordered so that the descriptors for the packets of a flow are in proper sequence. The scheduler 366 receives the properly ordered egress packet descriptors and pushes them onto appropriate queues in queue SRAM 367. Each such queue of egress packet descriptors is per port, per data type, per group of connections. Reference numeral 368 identifies one such queue. Packets of a connection in this case share the same set of source and destination IP addresses and TCP ports. Scheduler 366 schedules packets to be transmitted by popping egress packet descriptors off the queues in appropriate orders and at appropriate times, and by supplying the popped egress packet descriptors via conductors 381 to the DMA engine 363.

The ingress NBI island 72 maintains and stores a number of buffer lists 392. One of the buffer lists is a free buffer list and a second buffer list is an allocated buffer list. Packet data is received from an ingress MAC island into the ingress NBI island and is stored in SRAM 322. Individual portions of the packet data are stored in buffers in main memory. Each buffer has an associated buffer ID. The packet data of a packet may occupy multiple buffers, where the buffer IDs for the buffers are in one of the buffer lists. The DMA 323 causes the portions of packet data to be written into their corresponding buffers in external memory. The DMA 323 uses the CPP bus to do this. The DMA 323 also sends an ingress packet descriptor to a CTM in the ME island. The ingress packet descriptor includes a PPI number that is associated with the header portion of the packet as stored in the CTM. The ingress packet descriptor also includes a buffer list identifier that identifies the buffer list of buffer IDs (that store the packet payload in main memory). The ingress packet descriptor is converted into an egress packet descriptor 396 and is loaded into the queue SRAM 367 of the egress NBI island. There are lists of such egress packet descriptors stored in the queue SRAM 367. When the packet is scheduled to be output from the IB-NFP, then the egress packet descriptor 396 for the packet is sent to the DMA 363. The DMA engine 363 uses the buffer list identifier to obtain the buffer ID of the list from the ingress NBI island, and then uses the buffer IDs to read the associated packet data 397 from the indicated buffers. The DMA engine 363 also uses the PPI number of the packet to have the packet engine of the ME island return the header portion of the packet. The DMA engine 363 combines the header portion of the packet with data portions from the buffers and supplies the packet in sections via FIFO 365 to the packet modifier. The buffers that stored the packet data for the packet, at this point, are no longer used so their buffer IDs are recorded in a buffer descriptor memory 404 in the DMA engine 363. There may be multiple such lists of buffer IDs in the buffer descriptor memory 404 in the DMA engine 363. When the number of buffer IDs in this memory reaches a predetermined threshold condition, an event packet is generated. To prevent stalling of the egress NBI island, an event packet can also be generated when the de-allocate buffer list is full. This event generation methodology causes microengines to clear out buffer IDs from the de-allocate buffer list whenever the de-allocate buffer list is full, regardless of how many buffer IDs for any one microengine is stored in the de-allocation buffer list.

In one general example, the threshold condition is a multiple of the CPP bus data payload to improve bus utilization. In a more specific example, two buffer IDs fit in a single 64-bit DSF/CPP push bus cycle enabling reads of up to 32 buffer descriptors in a single CPP burst. For example, a CPP read command size of 16 results in 32 buffer IDs being read from the selected queue and pushed to its destination.

This event packet 399 is output from the egress NBI island onto the event bus. The event packet 399 is communicated through the event bus to the ME island. A microengine is alerted, and in response sends a CPP command 398 to the DMA engine 363 of the egress NBI island. This CPP command 398 is an instruction to the DMA engine to send a number of the buffer IDs 405 (recorded in the buffer descriptor memory of the DMA engine 363) across the CPP bus to the DMA engine 323 in the ingress NBI island 72. This command is also referred to as a "send buffer IDs command". These buffer IDs 405 are then pushed onto one of the free buffer lists in ingress NBI island 72. The DMA engine 363 also sends a complete command to the packet engine in the CTM of the ME island, instructing the packet engine to de-allocate the PPI number. In this way, the buffer IDs are allocated and de-allocated (or "freed"), and the PPI number is allocated and de-allocated. The amount of buffer space usable by a microengine is dynamically allocated, and is not fixed, but rather can increase and decreased over time as packets flow through the IB-NFP.

Figure 14:
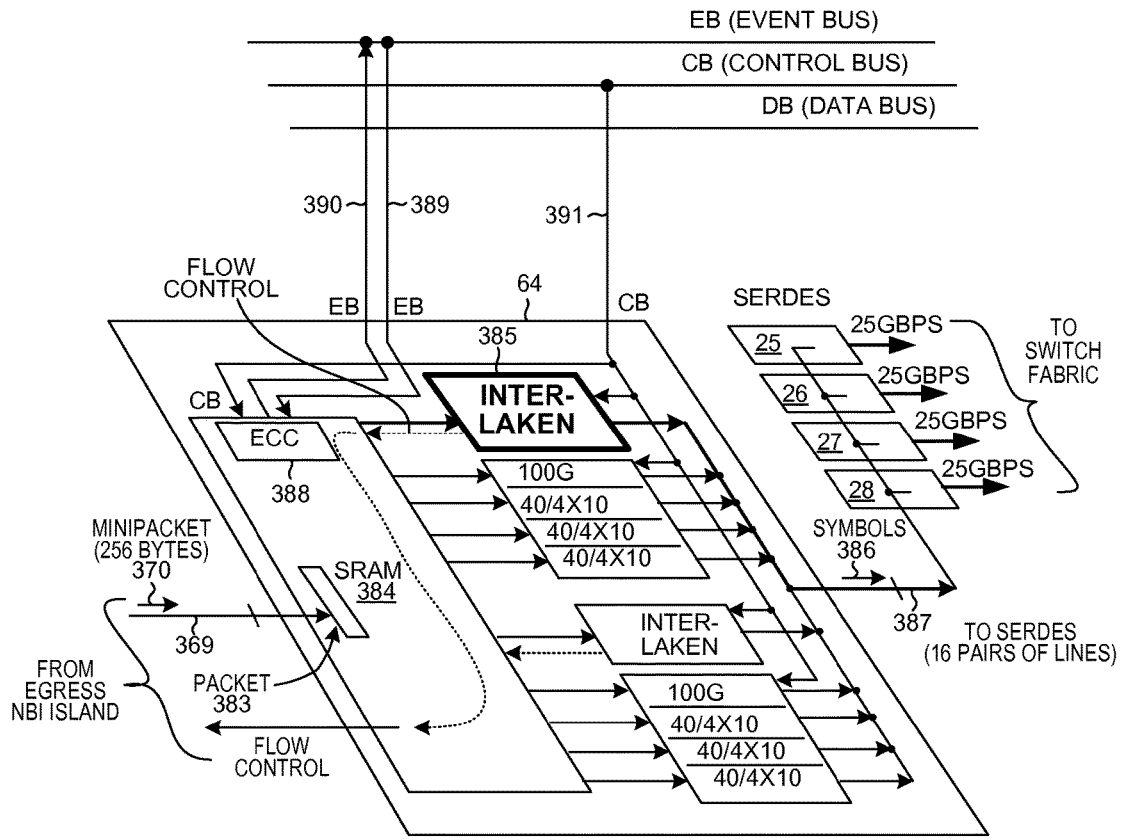
FIG. 14 is a diagram of egress MAC island 64 and SerDes blocks 25-28.

FIG. 14 is a diagram of egress MAC island 64. A packet 383 for transmission are received from egress NBI island 63 in the form of minipackets 370 via dedicated connections 369. The packets are buffered in SRAM 384. In the operational example, the packets to be output from the egress MAC island via are converted into symbols by Interlaken block 385. The resulting symbols 386 pass via dedicated connections 387 to the four SerDes I/O blocks 25-28. As described above in connection with FIG. 1, the four SerDes I/O blocks are coupled by SerDes connections 29 to switch fabric 9 of the MPLS router 1. ECC circuitry 388 of SRAM 384 is made a part of a local event ring via EB connections 389 and 390. Sub-circuits of MAC island are configurable. Configuration information for these sub-circuits is received from the control bus tree via connections 391.

Figure 15:
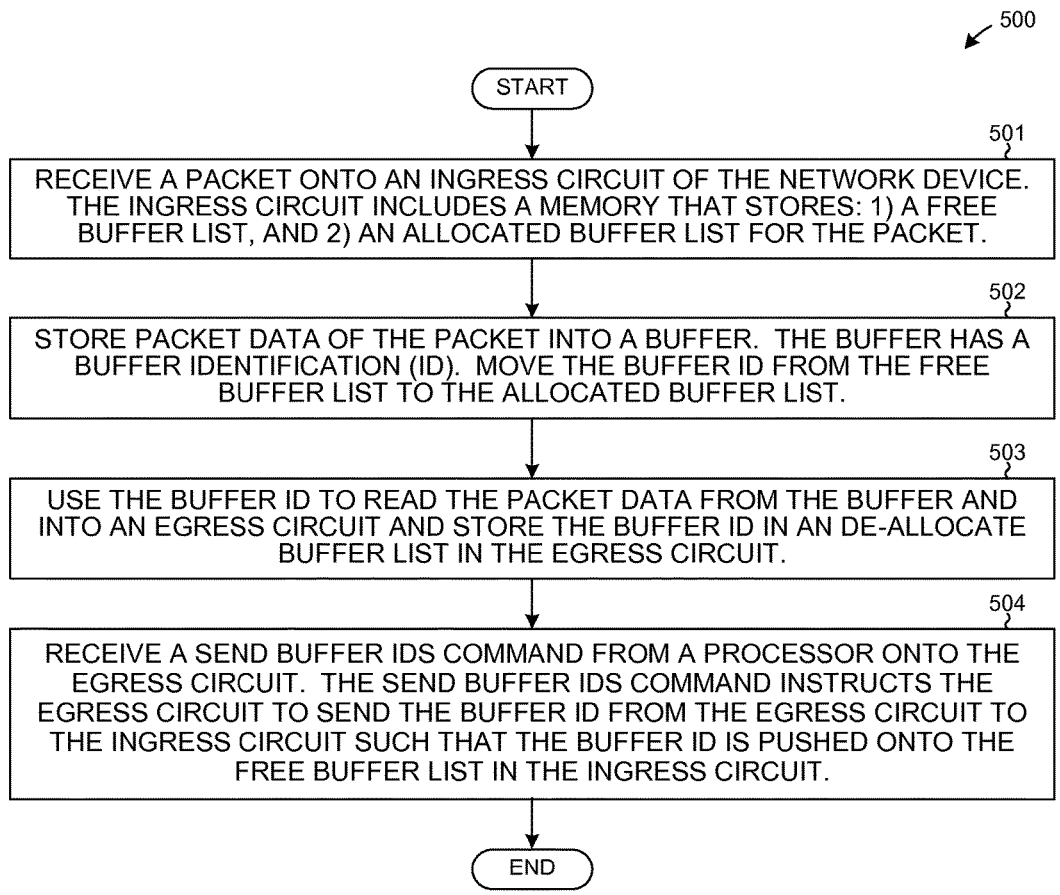
FIG. 15 is a flowchart 500 illustrating dynamic allocation of buffers.

FIG. 15 is a flowchart 500 illustrating the steps for the dynamic allocation of buffers. In step 501, a packet is received onto an ingress circuit of the network device. The ingress circuit includes a memory that stores: 1) a free buffer list, and 2) an allocated buffer list for the packet. In step 502, packet data of the packet is stored into a buffer. The buffer has a buffer identification (ID). The buffer ID is moved from the free buffer list to the allocated buffer list. In step 503, the buffer ID is used to read the packet data from the buffer and into an egress circuit and store the buffer ID in an de-allocate buffer list in the egress circuit. In step 504, a send buffer IDs command is received from a processor onto the egress circuit. The send buffer IDs command instructs the egress circuit to send the buffer ID from the egress circuit to the ingress circuit such that the buffer ID is pushed onto the free buffer list in the ingress circuit.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method of dynamically allocating buffers as packets are received and processed through a network device, comprising:
   (a) receiving a packet onto an ingress circuit of the network device, wherein the ingress circuit includes a first memory that stores a free buffer list, and an allocated buffer list, and wherein the ingress circuit is coupled to a bus;
   (b) storing packet data of the packet into a buffer, wherein the buffer is in a second memory and has a buffer identification (ID), and moving the buffer ID from the free buffer list to the allocated buffer list;
   (c) using the buffer ID to read the packet data via the bus from the buffer in the second memory and into an egress circuit, and storing the buffer ID in a de-allocate buffer list stored in a third memory located in the egress circuit, wherein the egress circuit is coupled to the bus, and wherein the ingress circuit and the egress circuit are located on an integrated circuit; and
   (d) receiving a send buffer IDs command via the bus from a processor onto the egress circuit, wherein the send buffer IDs command instructs the egress circuit to send the buffer ID from the egress circuit to the ingress circuit via the bus such that the buffer ID is pushed onto the free buffer list stored in the first memory located in the ingress circuit, wherein the ingress circuit is a hardware circuit, wherein the egress circuit is a hardware circuit, wherein the second memory is not part of the ingress circuit or the egress circuit, and wherein the first, second and third memories are separate hardware memory units located in different locations on the network device.

2. The method of claim 1, wherein the integrated circuit comprises a plurality of islands, wherein the ingress circuit is a part of a first island of the integrated circuit, wherein the egress circuit is a part of a second island of the integrated circuit, wherein the processor is a part of a third island of the integrated circuit, and wherein the send buffer IDs command of (d) is communicated across a CPP (Command/Push/Pull) bus from the third island to the second island.

3. The method of claim 1, wherein the network device comprises an event bus, the method further comprising:
   (e) determining on the egress circuit that a threshold condition has been satisfied and as a result outputting an event packet onto the event bus.

4. The method of claim 3, wherein the threshold condition is that at least a specific number of buffer IDs have been stored in the de-allocate buffer list.

5. The method of claim 3, wherein the threshold condition is that the de-allocate buffer list cannot store any additional buffer IDs.

6. The method of claim 3, further comprising:
   (f) receiving the event packet on the processor, wherein the processor responds to the receiving of the event packet by sending the send buffer IDs command of (d) to the egress circuit.

7. The method of claim 1, wherein the network device includes the integrated circuit and an external memory unit, wherein an internal memory unit is part of the integrated circuit, and wherein the storing of (b) involves:
   (b1) storing a first portion of the packet in the internal memory unit; and
   (b2) storing a second portion of the packet in the external memory unit.

8. The method of claim 7, wherein the first portion of the packet is a header, and wherein the second portion of the packet is a payload portion.

9. The method of claim 1, wherein the egress circuit includes a buffer descriptor memory, wherein the de-allocate buffer list is stored in the buffer descriptor memory, and wherein the buffer ID is added to the de-allocate buffer list by the egress circuit when the packet is transmitted by the egress circuit.

10. The method of claim 1, wherein the ingress circuit includes a buffer descriptor memory, and wherein the allocated buffer list is stored in the buffer descriptor memory.

11. The method of claim 1, further comprising:
    (e) removing the buffer ID from the de-allocate buffer list in the egress circuit after responding to the command of (d).

12. The method of claim 2, further comprising:
    (e) sending a complete command to the third island from the second island, wherein the complete command is sent in response to the send buffer IDs command, and wherein the complete command is an instruction to de-allocate a packet number.

13. A network device, comprising:
    an ingress circuit of an integrated circuit including a first memory unit that stores a free buffer list and an allocated buffer list;
    a buffer that stores a packet, wherein at least part of the packet is stored in a third memory unit, wherein the buffer has a buffer identification (ID); and
    an egress circuit on the integrated circuit that uses the buffer ID to read the packet via a first bus, wherein the egress circuit includes a second memory unit that stores a de-allocate buffer list, wherein the ingress circuit and the egress circuit are both hardware circuits, wherein the egress circuit outputs an event packet via a second bus when a threshold condition is met, wherein the ingress circuit and the egress circuit are coupled to the first bus, and wherein the egress circuit outputs a buffer ID via the first bus in response to receiving a send buffer IDs command and as a result the buffer ID is put on the free buffer list in the first memory unit in the ingress circuit, wherein the third memory unit is not a part of the ingress circuit and is not a part of the egress circuit.

14. The network device of claim 13, wherein the integrated circuit comprises a plurality of islands, wherein the ingress circuit is located on a first island, wherein the egress circuit is located on a second island, wherein a processor is located on a third island, and wherein the send buffer IDs command is communicated across a CPP (Command/Push/Pull) bus from the processor located on the third island to the second island.

15. The network device of claim 13, wherein the buffer ID is added to the allocated buffer list in response to storing the part of the packet in the buffer.

16. The network device of claim 13,
    wherein the third memory unit is an external memory unit that is external to the integrated circuit.

17. The network device of claim 13, wherein the integrated circuit comprises a plurality of islands, and wherein the network device further comprises:

an external memory unit that is not located on any of the islands, wherein a first portion of the packet is stored in the third memory unit, and wherein a second portion of the packet is stored in the external memory unit.

18. The network device of claim 17, wherein the first portion of the packet includes a packet header, and wherein the second portion of the packet includes a packet payload.

19. An integrated circuit, wherein the integrated circuit is adapted for coupling to an external memory, the integrated circuit comprising:
- an ingress circuit coupled to a bus that maintains a free buffer list and an allocated buffer list stored in a first memory located in the ingress circuit;
- an egress circuit coupled to the bus that maintains a de-allocate buffer list stored in a second memory located in the egress circuit, wherein the buffer lists store buffer identifications (buffer IDs), wherein the egress circuit generates an indication that at least a threshold number of buffer IDs are present in the de-allocate buffer list;
- a processor that processes packets received onto the integrated circuit, wherein the packets are received onto the integrated circuit via the ingress circuit and then at least part of the packets are stored by the integrated circuit into the external memory, wherein the processor, the ingress circuit, and the egress circuit are each separate physical circuits; and
- means for communicating the indication to the processor from the egress circuit, wherein in response to the indication being communicated to the processor the processor causes a buffer ID to be removed from the de-allocate buffer list of the egress circuit and to be stored onto the free buffer list of the ingress circuit.

20. The integrated circuit of claim 19, wherein the means for communicating is a part of an event bus that traverses the egress circuit.

* * * * *